UNITED STATES PATENT OFFICE.

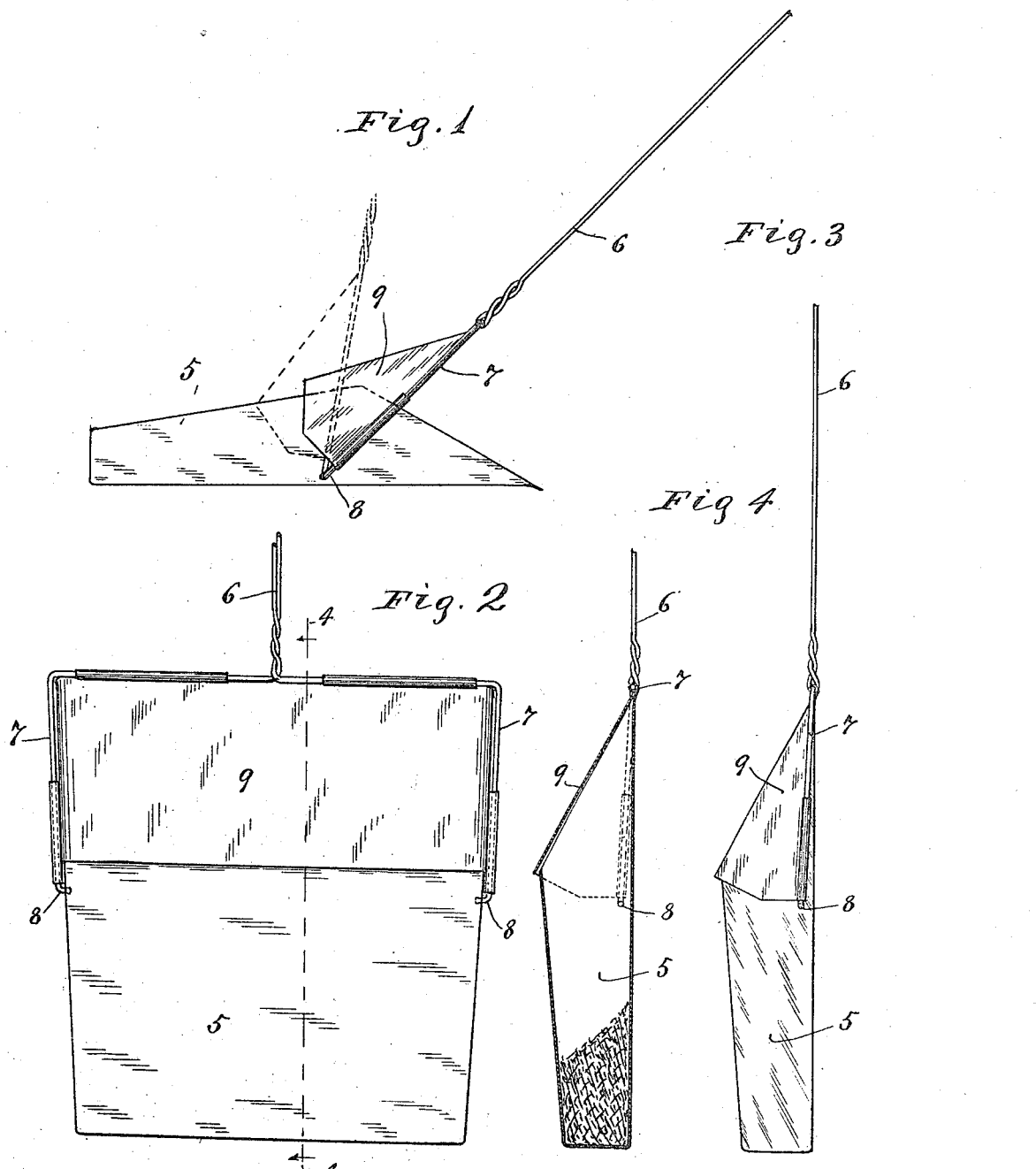

ELMER E. HIGGINS, OF REDCLIFF, ALBERTA, CANADA.

DUST PAN AND CARRYING BOX.

1,268,843.  Specification of Letters Patent.  Patented June 11, 1918.

Application filed January 15, 1917. Serial No. 142,382.

*To all whom it may concern:*

Be it known that I, ELMER E. HIGGINS, a citizen of the United States, residing at Redcliff, in the Province of Alberta, Canada, have invented certain new and useful Improvements in Dust Pans and Carrying Boxes; and I do hereby declare the following to be a full, clear, and exact description of the invention, such as will enable others skilled in the art to which it appertains to make and use the same.

My invention has for its object to provide a combined dust pan and carrying box; and to such ends, generally stated, the invention consists of the novel devices and combinations of devices hereinafter described and defined in the claims.

In the accompanying drawings which illustrate the invention, like characters indicate like parts throughout the several views.

Referring to the drawings;

Figure 1 is a side elevation of the improved dust pan and box, showing the same as if laid upon the floor, or in position to have the dust or rubbish swept into the same;

Fig. 2 is a front elevation showing the dust pan and box in an upright or carrying position;

Fig. 3 is a side elevation showing a dust pan and box in an upright position; and Fig. 4 is a section on the line 4—4 of Fig. 2.

The dust pan is in the form of a box 5, of sheet metal having its open end beveled so that the back thereof is adapted to be laid upon the floor and used as the bottom of the dust pan, as shown in Fig. 1.

The numeral 6 indicates a handle having laterally spaced prongs 7, the ends of which are turned inward to form trunnions 8 set into perforations and thereby pivotally connected to the sides of the box near the back thereof. To the prongs 7 is attached a hood-like cover 9 that flares from its upper edge downward and has such clearance from the box of the pan that it permits the handle to be turned nearly into an upright position when the pan is laid upon the floor, as shown in Fig. 1. When the combined dust pan and box is lifted by the handle 6, it will, by gravity, be swung into an upright position, and the hood or cover 9 will then tightly close the open upper end thereof. This automatic closing of the box by gravity, is due to the location of the trunnions 8 near the back of the box so that the greater weight of the box will be on the front side and thereby swing the box until its beveled upper end closes against the hood.

A combined dust pan and box of this character is not only very convenient, but sanitary. The box will hold a considerable amount of rubbish, so that it does not need to be emptied each time that a little dirt or rubbish is picked up. It may be hung up with a limited amount of rubbish therein and when it is desired to empty the same, it may be carried as a closed receptacle to the place where it is to be emptied.

What I claim is:

1. A combined dust pan and box comprising a box-like receptacle having a beveled open end, a handle having prongs embracing and pivoted to the sides of said box, and a hood rigidly attached to said prongs and arranged to close said box when hung in an upright position.

2. A combined dust pan and box comprising a box-like receptacle having a beveled open end, a handle having prongs embracing and pivoted to the sides of said box, and a hood rigidly attached to said prongs and arranged to close said box when hung in an upright position, the pivotal connection between said prongs and box being close to the back of the same, so that the box will swing by gravity until its beveled open end is stopped and closed by said hood.

In testimony whereof I affix my signature in presence of two witnesses.

ELMER E. HIGGINS.

Witnesses:
R. G. HOUSTON,
ED. L. STONE.

Copies of this patent may be obtained for five cents each, by addressing the "Commissioner of Patents, Washington, D. C."